(12) United States Patent
Yamada et al.

(10) Patent No.: US 6,665,251 B2
(45) Date of Patent: Dec. 16, 2003

(54) PROCESSING AND MANUFACTURING METHOD OF A MASTER FOR OPTICAL DISK, THE MASTER FOR OPTICAL DISK, A MANUFACTURING METHOD OF AN OPTICAL DISK SUBSTRATE, THE OPTICAL DISK SUBSTRATE, AND A PROCESSING DEVICE OF A MASTER FOR OPTICAL DISK

(75) Inventors: Hideaki Yamada, Suwa (JP); Hiroyasu Kaseya, Suwa (JP)

(73) Assignee: Seiko Epson Corporation (JP)

( * ) Notice: Subject to any disclaimer, the term of this patent is extended or adjusted under 35 U.S.C. 154(b) by 133 days.

(21) Appl. No.: 09/893,312

(22) Filed: Jun. 27, 2001

(65) Prior Publication Data

US 2002/0060967 A1 May 23, 2002

(30) Foreign Application Priority Data

Jun. 28, 2000 (JP) ........................................ 2000-195014

(51) Int. Cl.7 .................................................. G11B 7/00
(52) U.S. Cl. ................................ 369/59.11; 369/275.4; 369/44.26; 369/53.34
(58) Field of Search .......................... 369/47.1, 47.46, 369/53.1, 53.34, 53.41, 59.1, 59.12, 44.13, 44.26, 44.27, 275.1, 275.3, 275.4

(56) References Cited

U.S. PATENT DOCUMENTS

| 5,946,285 | A | * | 8/1999 | Nakane et al. ........... 369/275.3 |
| 6,091,700 | A | | 7/2000 | Kobayashi |
| 6,219,331 | B1 | * | 4/2001 | Miyamoto et al. ....... 369/275.4 |
| 6,337,839 | B1 | * | 1/2002 | Nakane et al. .......... 369/59.25 |

FOREIGN PATENT DOCUMENTS

| EP | 0851416 | 5/1993 |
| JP | 7-29186 | 1/1995 |
| JP | 10-320833 | 12/1998 |
| JP | 11-3547 | 1/1999 |

* cited by examiner

Primary Examiner—Muhammad Edun
(74) Attorney, Agent, or Firm—Harness, Dickey & Pierce, P.L.C.

(57) ABSTRACT

A processing method of a master for optical disk by a laser processing to form grooves, prepit groups on a groove track and prepit groups on a land track in a high quality and in a good balance. On an optical course of a laser beam for forming the prepit groups, an optical deflector is provided. Also, the laser beam is positioned to shoot on the center of the groove track and the land track. The deflector deflects the laser beam in the same amount of deflection to the opposite direction to form each of the prepit groups. Further, a difference in diffraction efficiencies by a difference in the deflection directions is corrected by controlling the laser power independently from each other.

12 Claims, 4 Drawing Sheets comparison of asymmetries

|  | no independent controls | | independently controled | |
|---|---|---|---|---|
|  | GROOVE | LAND | GROOVE | LAND |
| IN | 0.04 | 0.12 | 0.12 | 0.11 |
| MID | 0.06 | 0.13 | 0.11 | 0.12 |
| OUT | 0.08 | 0.12 | 0.11 | 0.10 |
| AVE | 0.06 | 0.12 | 0.11 | 0.11 |

PROCESSING AND MANUFACTURING METHOD OF A MASTER FOR OPTICAL DISK, THE MASTER FOR OPTICAL DISK, A MANUFACTURING METHOD OF AN OPTICAL DISK SUBSTRATE, THE OPTICAL DISK SUBSTRATE, AND A PROCESSING DEVICE OF A MASTER FOR OPTICAL DISK

BACKGROUND OF THE INVENTION

1. Field of the Invention

The present invention relates to a processing process of a master for optical disk. And more particularly to a processing method of the master for optical disk, a processing device which enables the processing method, and the master for optical disk produced by the processing method and a substrate for optical disk shaped by using the master.

2. Description of the Related Art

As a recording format for increasing recording density of an optical disk, a land and groove format is known in the art. This recording format records information both on a spiral or a concentric circular groove track which is formed along grooves, and a spiral or concentric circular land track which is formed along lands neighboring the grooves. Moreover, a prepit group for recording pre-formatted information, such as address information and a synchronous pattern for controlling a revolution of the disk is formed on a header of each groove and land. In order to make the signal levels of the groove track and the land track equivalent, the width of the groove and the width of the land are formed nearly equal. On the other hand, the width of the prepit group is narrower than the width of the groove.

In order to process such physical format, it is known to expose photosensitive material on a glass substrate for master by using three laser beams:

- a laser beam for processing the grooves;
- a laser beam for processing the prepit groups on the same spiral or circumference as the groove track; and
- a laser beam for processing the prepit groups on the same spiral or circumference as the land track.

However, there is a problem in that according to such related art, an optical system of a mastering device is enlarged and complicated. Moreover, it is difficult to prevent the interference of the laser beams. Further, since the laser beam for processing the prepit groups on the groove track and the laser beam for processing the prepit groups on the land track are different, a difference in the qualities of the laser beams is easily generated. Furthermore, an effort in uniforming the qualities of the prepit groups causes a difficulty in optimizing the qualities of the grooves.

On the other hand, it may be considered to process the grooves and prepit groups by one laser beam by using an optical deflector. However, since it is necessary to make the widths of the grooves and prepit groups different, optimizing the qualities of the grooves and prepit groups is difficult. Moreover, while the amount of deflection of the laser beam in the situations of processing the prepit groups on the groove track and processing the grooves is nearly 0, the amount of deflection of the laser beam in the situation of processing the prepit groups on the land track should be nearly the same as a track pitch. In this case, differences in the diffraction efficiencies, an optical aberration, etc. are raised by the deflection, which cause a problem that the prepit characteristics will become unbalanced.

SUMMARY OF THE INVENTION

The present invention solves the aforementioned problems by forming the prepit groups by one laser beam to a master for optical disk of the aforementioned physical format. Moreover, the present invention makes it possible to form a high quality and well balanced prepit groups on a groove track and a land track by laser processing. Further, the present invention conducts groove processing by another laser beam. Accordingly, it is possible to form the laser beams, which suit each of the desired characteristics.

Moreover, the present invention provides a mastering device having an optical deflector on an optical course of a laser optical system for processing the prepit groups. The shooting position, in the event of no optical deflection of the laser beam, is set to the different position from the shooting position of the laser beam for processing grooves by nearly a half of a track pitch in a radial direction. In other words, the laser beam for processing the prepit groups is positioned to shoot on the middle position between the groove track and the land track.

Further, the optical deflector deflects the laser beam for processing the prepit groups in the same amount both to the position of the groove track and to the position of the land track. Furthermore, a subtle difference in diffraction efficiencies caused by a difference in the deflection directions is corrected and optimized by controlling the laser power independently from each other. Moreover, the laser power is respectively controlled in accordance with the length of each of the prepits on the groove track and the land track.

In the figures:
101 is a laser device;
102 is a laser beam;
103 and 104 are beam splitters;
105 and 106 are laser beams;
107 and 108 are light modulators;
109 and 110 are beam splitters;
111 is an optical deflector;
112 is a mirror;
113 is a beam splitter;
114 is a mirror;
115 is an objective lens;
116 is a movable table;
117 is a glass substrate for master;
118 is a turntable;
119 is a signal generator;
201 and 202 are laser beam spots;
203 is a groove;
204 is a land;
205 and 206 are prepit groups;

301 is a groove modulating signal;
302 is a prepit groups modulating signal; and
303 is a laser beam deflecting signal.

DESCRIPTION OF THE PREFERRED EMBODIMENTS

A processing device and method according to an embodiment of the present invention is explained below with reference to the figures.

Figure 1:
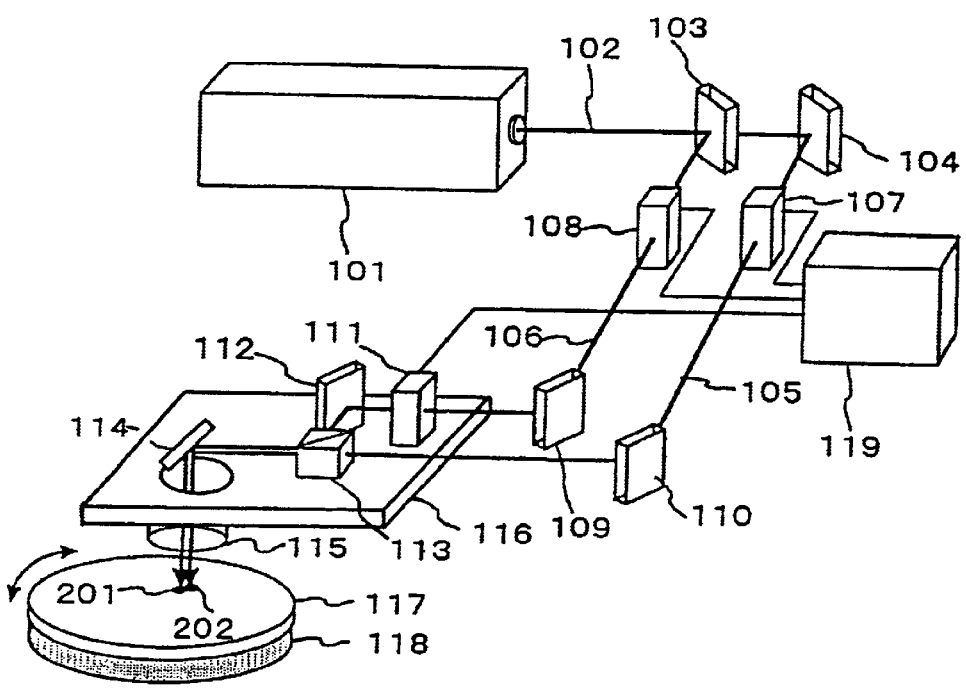
FIG. 1 is a schematic block diagram of the exposure device used in a processing method of a master for optical disk according to an embodiment of the present invention.

FIG. 1 is a schematic block diagram of the exposure device used in a processing method of a master for optical disk according to an embodiment of the present invention, which especially shows an optical course of a laser beam. This exposure device comprises: a laser device 101 for generating a laser beam, light modulators 107 and 108 for controlling a laser power in accordance with control signals, an optical deflector 111 for switching irradiated positions of a laser beam for processing the prepit groups, and a turntable 118 for rotating a glass substrate.

A laser beam 102 irradiated from the laser device 101 is divided by a beam splitter 103, into a laser beam 105 for processing grooves and a laser beam 106 for processing prepit groups. Those laser beams are modulated in the light modulators 107 and 108 in accordance with the control signals output from a signal generator 119. The laser beam for processing prepit groups 106 is modulated in the light modulator 108 and then deflected by the optical deflector 111 in accordance with the signals output from the signal generator 119.

The laser beam 106 deflected by the optical deflector 111 is reflected by a mirror 112 and then meet the laser beam 105 at a beam splitter 113. The two laser beams 105 and 106 are reflected by a mirror 114. The laser beams are then condensed by an objective lens 115 on a glass substrate 117 on which photosensitive material is coated, and form laser beam spots 201 and 202 on a surface of the glass substrate.

A movable table 116 on which the objective lens 115, the beam splitter 113, the mirror 112 and the mirror 114 are provided moves in a radial direction of the glass substrate 117 at a constant speed relative to the turntable 118 which rotates at constant angular speed. In the rotation and movement, the movable table 116 moves one groove pitch in a radial direction from the inner position to the outer while one rotation of the glass substrate 117.

Figure 2:
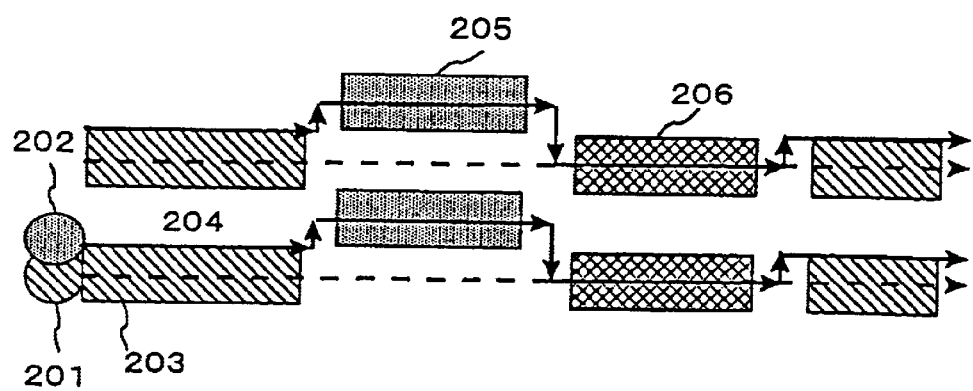
FIG. 2 is a diagram showing the scanning route of a laser beam in the processing method of the master for optical disk according to the embodiment.

FIG. 2 is a diagram showing the scanning route of laser beam in the production method of the master for optical disk according to the present embodiment. A groove 203 is formed in a circumferential direction (shown in a horizontal direction in FIG. 2) with predetermined intervals to compose a groove track. A land track comprising a land 204 formed in a circumferential direction, is neighboring the groove track. Those groove track and land track may be concentric circular but here, each of the groove track and the land track is spirally formed. Thus, the groove track and the land track are alternately formed in a radial direction (shown in a vertical direction in FIG. 2).

On the spiral of the groove track, prepit groups 206 for recording address information of each sector, etc. are formed between each of the grooves. On the spiral of the land track, prepit groups 205 for recording address information of each sector of the land track, etc. are formed. The prepit groups 205 are not overlapped with the groove 203 of the neighboring groove track in a radial direction. Especially the prepit groups 206 on the groove track and the neighboring prepit groups 205 on the land track are formed on the position where those prepit groups are not overlapped with each other in a radial direction.

The laser beam 105 for processing the groove 203 irradiates on the position shown by the laser beam spot 201. As the glass substrate 117 rotates, the groove 203 is processed.

The laser beam 106 for processing the prepit groups 205 and 206 irradiates on the position shown by the laser beam spot 202 when the optical deflector 111 is neutral; that is to say, when the amount of optical deflection is 0. When the laser beams 105 and 106 meet at the beam splitter 113, the position of the laser beam spot 202 will be different from the position of the laser beam spot 201 by nearly a half distance of a track pitch in a radial direction. The circumferential position of the laser beam spot 202 will be the same as the laser beam spot 201. The track pitch here means a pitch between the groove track and the land track.

When the groove 203 is processed by the laser beam 201, the laser beam 202 will be turned off by the light modulator 108. After such groove processing of the sector is finished, the laser beam 202 will be shifted by the optical deflector 111 in the opposite direction of the groove 203 processed before by a half of the track pitch in accordance with the output signals of the signal generator. In other words, the laser beam 202 is deflected on the center of the neighboring groove track 204. After the deflection is completed, the laser beam 202 is modulated in the light modulator 108 on the optical course of the laser beam 202 by the signals output from the signal generator 119 in accordance with the address information, etc. of the prepit groups 205 on the land track. In this case, the laser power is controlled so that the laser power will be well balanced with the characteristics of the prepit groups 206 on the groove track as mentioned below.

Next, the laser beam 202 will be shifted in the same direction as the groove 203 processed immediately before by the optical deflector 111, by a distance of the track pitch. In other words, the laser beam 202 is deflected on the center of the neighboring groove track 203. When the deflection is completed, the laser beam 202 will be modulated by the signals output from the signal generator 119 in accordance with the address information, etc. of the prepit groups 206 on the groove track. In this case, the laser power is controlled so that the laser power will obtain the proper characteristics in the same way as the aforementioned processing of the prepit groups 205 on the land track.

When such processing of the prepit groups is conducted, the laser beam 201 for processing grooves will be turned off by the light modulator 107. After the processing of the prepit groups, the laser beam 202 for processing the prepit groups will be turned off. After that, the next groove will be processed by the laser beam 201. By the end of such groove processing, the optical deflector on the optical course of the laser beam 202 will return to a neutral state and the distance between the laser beams 201 and 202 will be reset to a half of the track pitch.

By the aforementioned operations, it is possible to form one sector of the prepit groups on the groove track, one sector of the prepit groups on the land track and one sector of the groove is formed in one cycle. By repeating such operation, one round of the groove track and one round of the neighboring land track can be formed in every rotation of the glass substrate 117.

Figure 3:
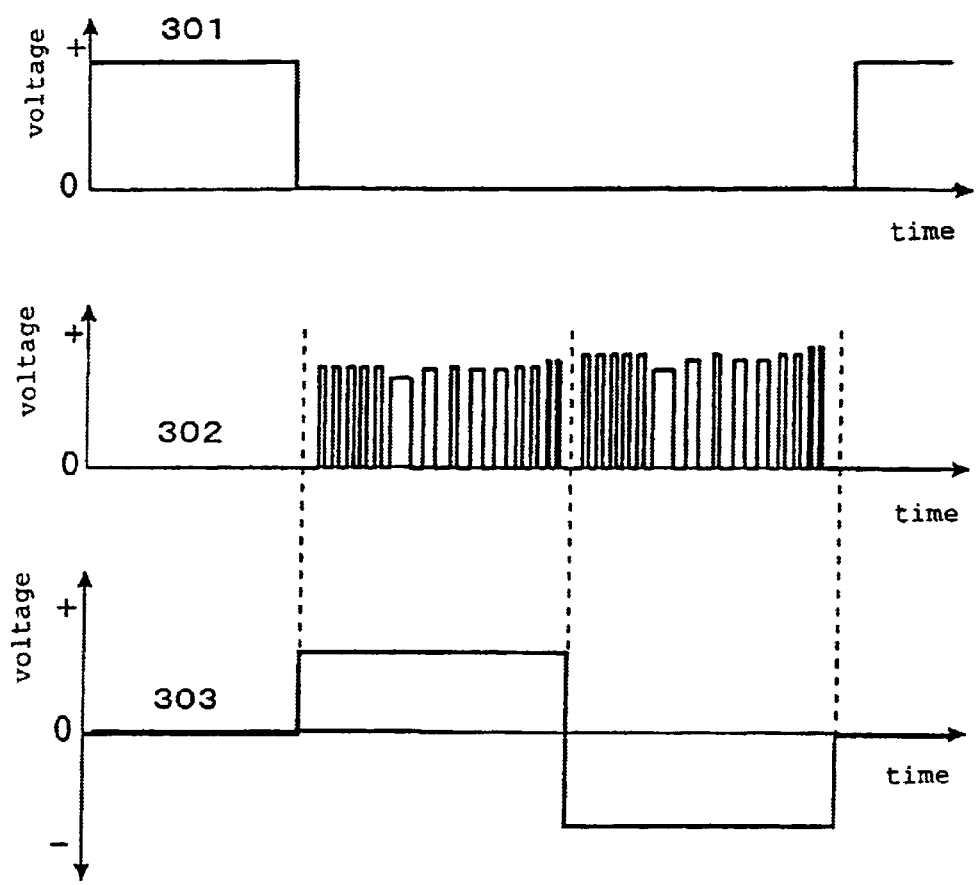
FIG. 3 is a time chart of the control signals output from a signal generator in order to realize the laser scanning shown in FIG. 2.

FIG. 3 is a time chart of the control signals output from the signal generator 119 for the laser scanning shown in FIG. 2.

A signal 301 is for modulating the laser beam 201 (105) in order to process the groove 203. The signal 301 is a rectangular signal generated in accordance with the timing of the processing of the groove 203 shown in both the right and left ends of FIG. 2. In the event of the processing of the prepit groups 205 and 206 shown in the center of FIG. 2, the signal 301 is not applied and grooves are not formed.

A signal 302 is for modulating the laser beam 202 (106) in order to process the prepit groups 205 and 206, and controls pulse widths in accordance with each pit length. Moreover, the signal 302 conducts analogue modulation in order to correct a difference in diffraction efficiencies caused by a difference in the deflection directions. By these operations, the laser power is controlled. During the groove processing, signal 302 is not applied.

A signal 303 is for controlling the optical deflection of the laser beam 106 in order to set the radial positions of the prepit groups 205 and 206. In the processing of the prepit groups 205 and 206, the signal 303 conducts optical deflection in the opposite direction by applying rectangular signals of positive and negative reverse voltage. In the processing of the grooves, the signal 303 will not be applied.

Figures 4, 5:
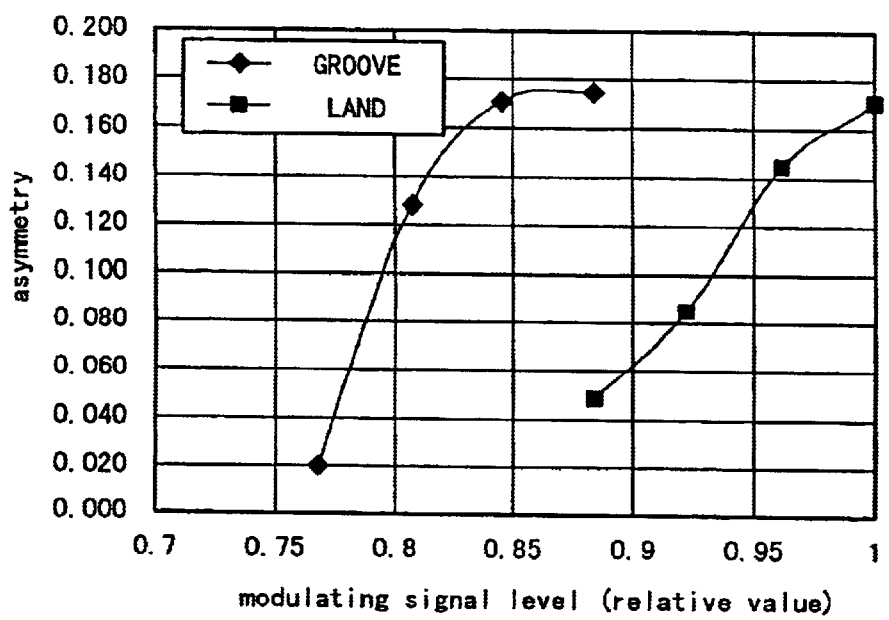
FIG. 4 is a graph showing the relation between the modulating signal level for controlling the laser power of a laser beam for forming the prepit groups output from a light modulator, and the measurement result of the asymmetry in the event that prepit groups are formed by such laser beam.
FIG. 5 is a comparison table of the asymmetry of prepit groups when the laser power is not independently controlled, and when the laser power is independently controlled.

FIG. 4 is a graph showing the relation between the modulating signal level (the relative value) for controlling the laser power for forming the prepit groups, and the measurement result of the asymmetry in the event that prepit groups are formed by such laser beams. According to this graph, when the asymmetry is 0.1, the signal level at the time of processing the prepit groups on the groove track will need to be about 0.8 and the signal level at the time of processing the prepit groups on the land track will need to be about 0.94. As mentioned above, by controlling the signal levels independently at the time of processing the prepit groups on the groove track and the land track, the asymmetry can be made uniformed.

FIG. 5 is a comparison between the asymmetry of prepit groups when the laser power is not independently controlled and the asymmetry of prepit groups when the laser power is independently controlled. In the event of no independent controls, in other words, in the event of applying the same level of modulating signals at the time of processing the prepit groups on the groove track and the land track, the asymmetry of the prepit groups on the groove track is 0.06 on average and the asymmetry of the prepit groups on the land track is 0.12 on average. On the other hand, in the event of irradiating lasers having different powers into the deflector by the aforementioned independent controls, the asymmetries of the prepit groups on the groove track and on the land track are both 0.11 on average, which makes it possible to obtain a uniformed quality of the prepit groups.

As explained above, by exposing the glass substrate 117 coated with photosensitive material, latent images of the groove 203, the prepit groups 205 and 206 are formed. After that, by developing the glass substrate 117, a master for optical disk comprising a concave that composes the grooves and the prepit groups on the glass substrate is formed.

Next, in order to form a stumper from the master for optical disk, a Ni film which is to be a conductive film is formed on the aforementioned master for optical disk by sputtering, etc. Then, by Ni electroforming the master for optical disk to form a Ni plate. Next, by stripping the Ni plate from the master for optical disk, removing a photoresist layer and polishing the back side of the Ni plate, a stumper is produced with a convexoconcave pattern that is opposite to that of the master for optical disk.

Then, by using this stumper, large quantities of substrates for optical disk can be produced by the injection molding method.

The contents explained above concern the embodiments of the present invention, which does not mean that the present invention is limited to the embodiments.

As explained above, according to the present invention, it is possible to easily form the aforementioned physical format by optical deflection of an optical deflector and by using two laser beams. Accordingly, it is possible to produce a master for optical disk of a high quality. Moreover, by systematizing the method of the present invention and providing the method on a mastering device, it is possible to provide a mastering device that is highly efficient to mass-producing without complicating and enlarging the optical system.

What is claimed is:

1. A processing method of a master for optical disk for forming grooves which configure a groove track, prepit groups on the same spiral or circumference as said groove track and prepit groups on the same spiral or circumference as a land track neighboring said groove track, comprising:

a process for irradiating a laser beam on the master on which photosensitive material is coated in order to form prepit groups on the same spiral or circumference as said groove track; and a process for irradiating a laser beam on said master in order to form prepit groups on the same spiral or circumference as said land track, wherein each said irradiating process is alternately conducted by sequentially switching radial positions of irradiating a laser beam for forming the prepit groups while changing a circumferential position of said laser beam for forming the prepit groups on said master.

2. The processing method of a master for optical disk according to claim 1, wherein a laser beam for forming said grooves separate from said laser beam for forming the prepit groups is irradiated on said master alternately with said irradiating processes.

3. The processing method of a master for optical disk according to claim 1, wherein said switching of said radial positions of the laser beam for forming the prepit groups is conducted by using optical deflection;

the irradiated position of said laser beam for forming the prepit groups without said optical deflection is set on the center of said groove track and said land track neighboring said groove track; and said deflections to said groove track and said land track are the same amount in the opposite direction to each other.

4. The processing method of a master for optical disk according to claim 3, wherein the laser powers before the deflection are different from each other in accordance with the diffraction efficiencies of the deflection to said groove track and said land track.

5. A manufacturing method of a master for optical disk comprising:

a process for irradiating a laser beam on said master by using the processing method of a master for optical disk according to claim 1; and a process for forming said groove and said prepit groups by developing said master.

6. A manufacturing method of an optical disk substrate comprising:

a process for producing a master for optical disk by using the manufacturing method of a master for optical disk according to claim 5;

a process for forming a stumper by conducting an electroforming on said master for optical disk; and a process of injection molding by using said stumper.

7. An optical disk produced by using the manufacturing method of an optical disk substrate according to claim 6.

8. A master for optical disk produced by using the manufacturing method of a master for optical disk according to claim 5.

9. The processing method of a master for optical disk according to claim 1, wherein a laser beam for forming said grooves separate from said laser beam for forming the prepit groups is irradiated on said master.

10. A processing device of a master for optical disk for forming grooves which configure a groove track, prepit groups on the same spiral or circumference as said groove track and prepit groups on the same spiral or circumference as a land track neighboring said groove track comprising:

means for generating a laser beam for forming the prepit groups;

means for moving a circumferential position of said laser beam for forming the prepit groups on a master on which photosensitive material is spread; and means for sequentially switching radial positions of said laser beam for forming the prepit groups, with the movement of said circumferential position in order to form each latent image of said prepit groups on said groove track and said land track.

11. The processing device of a master for optical disk according to claim 10, further comprising a control means for controlling the laser power of said laser beam for forming the prepit groups, wherein said means for switching radial positions of said laser beam for forming the prepit groups comprises an optical deflector provided on a path of said laser beam for forming the prepit groups, and wherein said control means controls a laser power in accordance with the diffraction efficiencies of the optical deflector before and after switching radial positions of said laser beam for forming the prepit groups.

12. The processing device of a master for optical disk according to claim 10, wherein a laser beam for forming said grooves separate from said laser beam for forming the prepit groups is irradiated on said master.

* * * * *

UNITED STATES PATENT AND TRADEMARK OFFICE
CERTIFICATE OF CORRECTION

PATENT NO. : 6,665,251 B2
DATED : December 16, 2003
INVENTOR(S) : Hideaki Yamada and Hiroyasu Kaseya It is certified that error appears in the above-identified patent and that said Letters Patent is hereby corrected as shown below:

Column 5,
Lines 53, 60 and 62, "stumper" should be -- stamper --
Line 60, "convexoconcave" should be -- convex/ concave --

Column 6,
Lines 65 and 67, "stumper" should be -- stamper --

Signed and Sealed this

Twenty-second Day of June, 2004

JON W. DUDAS
*Acting Director of the United States Patent and Trademark Office*